(12) United States Patent
Galle et al.

(10) Patent No.: US 11,321,788 B2
(45) Date of Patent: May 3, 2022

(54) SYSTEMS AND METHODS FOR RIG SCHEDULING WITH OPTIMAL FLEET SIZING

(71) Applicant: Schlumberger Technology Corporation, Sugar Land, TX (US)

(72) Inventors: Virgile Galle, Paris (FR); Kashif Rashid, Wayland, MA (US); Peter Tilke, Watertown, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 537 days.

(21) Appl. No.: 16/166,267

(22) Filed: Oct. 22, 2018

(65) Prior Publication Data
US 2020/0126165 A1  Apr. 23, 2020

(51) Int. Cl.
*G06Q 50/02* (2012.01)
*G06Q 10/06* (2012.01)

(52) U.S. Cl.
CPC ....... *G06Q 50/02* (2013.01); *G06Q 10/06313* (2013.01); *G06Q 10/06314* (2013.01)

(58) Field of Classification Search
CPC ............. G06Q 50/02; G06Q 10/06313; G06Q 10/06314
USPC ....................................................... 705/7.23
See application file for complete search history.

(56) References Cited

U.S. PATENT DOCUMENTS

| | | | |
|---|---|---|---|
| 2004/0220846 A1* | 11/2004 | Cullick | G06Q 10/0637 705/7.22 |
| 2008/0288226 A1 | 11/2008 | Gurpinar et al. | |
| 2011/0173042 A1* | 7/2011 | Riepshoff | G06Q 10/0639 705/7.26 |
| 2015/0267524 A1 | 9/2015 | Embid Droz et al. | |
| 2015/0294258 A1 | 10/2015 | Hildebrand et al. | |
| 2019/0043141 A1* | 2/2019 | Lundh | E21C 41/26 |

FOREIGN PATENT DOCUMENTS

WO   2017058089 A1   4/2017

OTHER PUBLICATIONS

"Planning and scheduling a fleet of rigs using simulation-optimization", Oct. 25, 2012, to Bassi et al. (Year: 2012).*
Perez2, May 29, 2018, "Optimizing Workover Rig Fleet Sizing and Scheduling Using Deterministic and Stochastic Programming Models" (Year: 2018).*
Bassi2, Oct. 25, 2012, "Planning and scheduling a fleet of rigs using simulation-optimization" (Year: 2012).*
(Continued)

*Primary Examiner* — Charles Guiliano
*Assistant Examiner* — Po Han Lee
(74) *Attorney, Agent, or Firm* — Alec J. McGinn

(57) ABSTRACT

Systems and methods for optimizing oilfield rig fleet scheduling and deployment are disclosed. Wells are identified to have time constraints by which they are grouped into "ON", "BY", and "ADD" categories. ON wells have a beginning drilling availability window; BY wells have an ending drilling availability time only; and ADD wells have no beginning or ending time of drilling availability. The systems and methods optimize scheduling with ON wells having higher priority than BY wells, and BY wells having higher priority than ADD wells.

13 Claims, 6 Drawing Sheets

(56) References Cited

OTHER PUBLICATIONS

Santos, Jun. 26, 2018, "Mathematical Programming Models and Local Search Algorithms for the Offshore Rig Scheduling Problem" (Year: 2018).*

Perez, Aug. 9, 2016, "A New Mathematical Model for the Workover Rig Scheduling Problem" (Year: 2016).*

* cited by examiner

```
1:  procedure WEIGHT SCORING(y)
2:      currentRig[r] is the earliest day when r is available
3:      t_r ← min{currentRig}
4:      while t_r ≤ T and all wells are not assigned do
5:          r ← argmin_{s∈{1,...,R}} {C_s | currentRig[s] = t_r} (rig available at t_r with maximum capacity)
6:          urgentWells ← {w' | T_{w'}^S < t_r + C_r + M_r}
7:          while urgentWells ≠ ∅ and no urgent well has been assigned to r do
8:              w ← argmin_{w'∈urgentWells} {T_{w'}^S}
9:              For each rig s' available to drill w, t_{s',w} is the earliest start drilling day after t_r.
10:             s ← argmax_{s'} {C_{s'} | t_{s',w} − currentRig[s'] = min_{s''}{t_{s'',w} − currentRig[s'']}}
11:             Assign w to rigSchedule[s] on day t_{s,w} and delete w from urgentWells
12:             currentRig[s] ← t_{s,w} + C_s
13:         if no urgent well has been assigned to r then
14:             For each well w' that r can drill between days t_r and t_r + C_r + M_r − 1, t_{r,w'} is the earliest start drilling day.
15:             nonUrgentWells = {w' ∈ {1,...,W} | t_{r,w'} ≤ t_r + C_r + M_r}
16:             w = argmax_{w'∈nonUrgentWells} {f_y(w', t_r, t_{r,w'})}
17:             Assign w to rigSchedule[r] on day t_{r,w}
18:             currentRig[r] ← t_{r,w} + C_r
19:         if no well has been assigned to r then
20:             currentRig[r] ← currentRig[r] + 1 (increment time)
21:         t_r ← min{currentRig}
22:     return rigSchedule
```

Fig. 1

```
1:  procedure GREEDY
2:      sortedWells ← sort the wells lexicographically according to (T_w^E, V_w)
3:      while sortedWells is not empty do
4:          w ← pop(sortedWells)
5:          For each rig s available to drill w, t_{s,w} is the earliest start drilling day within [T_w^S, T_w^E].
6:          if there is at least one rig that can drill w then
7:              r ← argmax_s {C_s | t_{s,w} = min_{s'}{t_{s',w}}}
8:              Assign w to rigSchedule[r] on day t_{r,w}
9:      return rigSchedule
```

Fig. 2

```
1: procedure SCHEDULING(T^solve)
2:     T^ON ← T^solve × min{max{|W_ON|/W, 1/3}, 2/3} and solve IPON with a time limit of T^ON
3:     gap ← resulted optimality gap
4:     t^ON ← solving time of IPON (t^ON ≤ T^ON)
5:     if gap < |W_ON| × max{V_w} then
6:         Assign ON wells using IPON method to rigSchedule
7:         T^BY ← (T^solve − t^ON) × max{|W_BY|/(W−|W_ON|), 1/2}
8:         Assign BY wells using G method to rigSchedule with a time limit of T^BY
9:         t^BY ← solving time of G (t^BY ≤ T^BY)
10:        T^ADD ← T^solve − (t^ON + t^BY)
11:        Assign ADD wells using WS method to rigSchedule with a time limit of T^ADD
12:    else
13:        T^ON/BY/ADD ← T^solve − t^ON
14:        Assign ADD wells using WS method to rigSchedule with a time limit of T^ON/BY/ADD
15:    return rigSchedule
```

Fig. 3

```
1:  procedure FASTGREEDY
2:      sortedWells ← sort the wells lexicographically according to $(T_w^E, V_w)$
3:      rank rigs by decreasing rig capacity
4:      currentRig[r] is the earliest day when r is available
5:      $t_r$ ← min{currentRig}
6:      while $t_r \leq T$ and sortedWells is not empty do
7:          for $r \in \{1, \ldots, R\}$ available on $t_r$ do
8:              if at least one well can be drilled on date $t_r$ then
9:                  select such highest ranked well $w$
10:                 remove $w$ from sortedWells
11:                 currentRig[r] ← currentRig[r] + $C_r$
12:             else
13:                 currentRig[r] ← currentRig[r] + 1
14:         $t_r$ ← min{currentRig}
15: return rigSchedule
```

Fig. 8

SYSTEMS AND METHODS FOR RIG SCHEDULING WITH OPTIMAL FLEET SIZING

BACKGROUND

For oilfield drilling operations, the rig scheduling problem concerns finding a schedule for a fleet of rigs given a list of potential wells to be drilled. Each rig has a capacity and time period of availability, while each well comprises a production value, a pad assignment and a time window in which it can be drilled. Operational constraints limit the number of rigs on a pad to one, and the moving and dismantling time is applicable each time a rig moves from one pad to another. There is a need for an improved method for optimizing resources.

BRIEF DESCRIPTION OF THE FIGURES

FIG. 1 illustrates pseudo code for weight scoring method according to embodiments of the present disclosure.

FIG. 2 illustrates pseudo code for the Greedy method according to embodiments of the present disclosure.

FIG. 3 illustrates pseudo code for a scheduling algorithm according to embodiments of the present disclosure.

FIG. 8 illustrates pseudo code for a fast greedy method according to embodiments of the present disclosure.

SUMMARY

Figure 4:
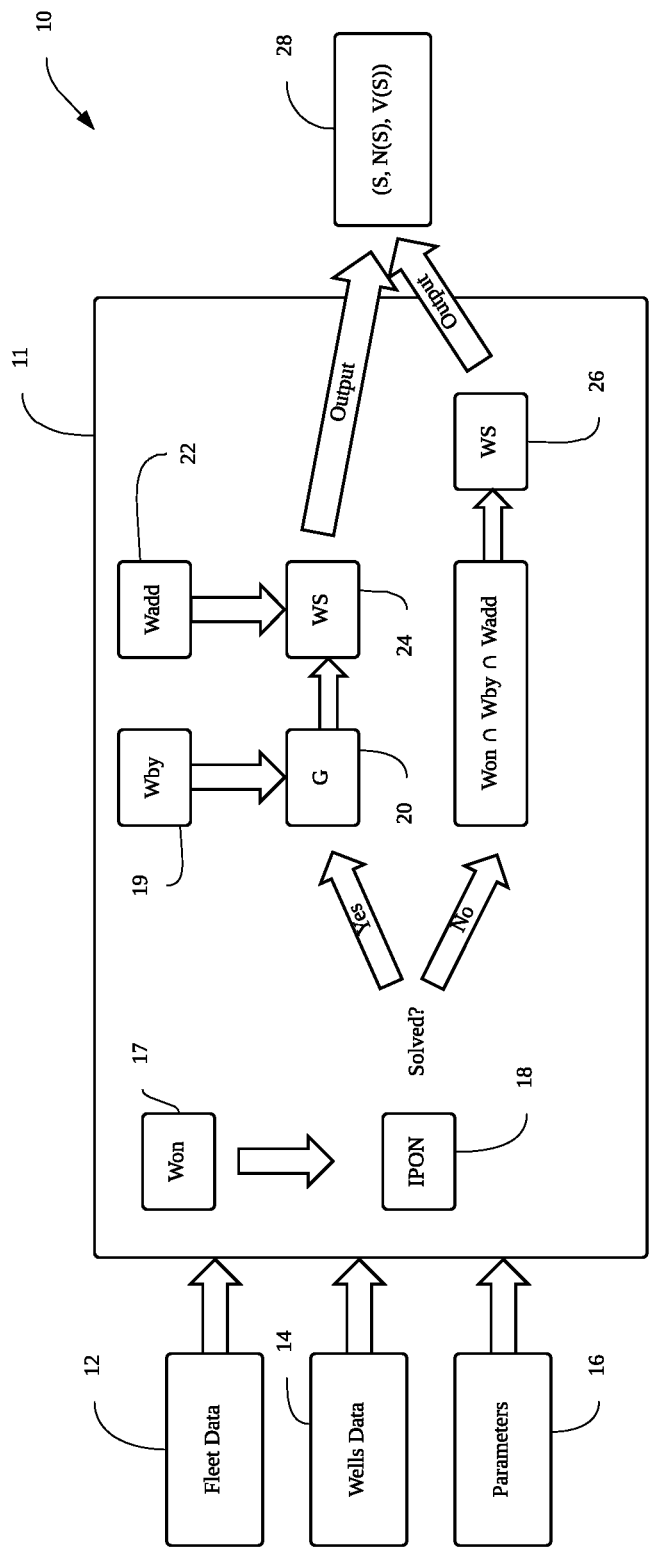
FIG. 4 is a schematic diagram illustrating systems and methods for optimizing rig scheduling according to embodiments of the present disclosure.

Embodiments of the present disclosure are directed to a method including receiving a list of wells to be drilled and dividing the wells into ON wells which have a specific start date of availability, BY wells which have a fixed end date of availability but no start date of availability; and ADD wells which have no start or end data of availability. Availability in this context generally means that the well is available to be accessed and/or drilled. The method also includes receiving fleet data, wells data, and parameters, wherein the parameters include a time horizon for the drilling operation. The method also includes attempting to solve an integer problem according to the ON wells, and if the integer problem is solved, implementing a greedy method for BY wells and a weight scoring method for ADD wells. If the integer problem is not solved, the method continues by implementing the weight scoring method for all wells, and outputting a schedule for rigs and the wells.

The greedy method may include sorting wells according to the earliest day on which the wells are available and then by a value of the wells, and for each rig available to drill, identifying an earliest start date and assigning a rig to the start date for the well. The weight scoring method may include identifying urgent wells. An urgent well is a well in which the earliest time to start drilling the well is earlier than the earliest time a rig is available, when factoring in the cost of using the rig and a moving cost for the rig. The method also includes identifying non-urgent wells. A non-urgent well has a potential start date such that there is an available start date for at least one rig that is earlier than the earliest available date for the well. The method also includes randomly choosing weights, repeatedly calculating a solution using weights generated by the weights, and retaining a solution that maximizes an objective value of the solution. If there is no improvement of the objective value of the solution after a predetermined number of attempts, the method continues by ceasing calculating the solution and delivering the retained solution. Urgent wells are given higher priority than non-urgent wells.

Other embodiments are directed to a method for optimizing fleet scheduling, including identifying ON wells which have a beginning time of availability, BY wells which have an end time but no beginning time of availability, and ADD wells which have no beginning or end time of availability, according to ON, BY, and ADD constraints. The method also includes scheduling rigs to drill the wells with ON wells having higher priority than BY wells, and with BY wells having higher priority than ADD wells, and returning a schedule for rigs and wells, the schedule having a value corresponding to a number of ON, BY, and ADD constraints which are satisfied by the schedule.

Still further embodiments of the present disclosure are directed to a system for optimizing a rig schedule for drilling a plurality of wells. The system includes a scheduler configured to receive fleet data, wells data, and solving parameters. The scheduler is configured to identify according to time constraints in the wells data: wells that have a beginning date of availability as ON wells, wells that have an end date but no beginning date of availability as BY wells, and wells that have no beginning or end date of availability as ADD wells. The scheduler is further configured to solve an integer problem for ON wells, a greedy method for BY wells, and a weight scoring method for ADD wells, and to output a schedule having a score, wherein the score pertains to how many of the time constraints are satisfied by the schedule. If the integer problem is not solved in a predetermined time period the scheduler is configured to implement the weight scoring method for all wells. The system also includes an optimizer configured to iteratively pass the fleet data, wells data, and solving parameters to the scheduler and to optimize based on the score.

DETAILED DESCRIPTION

The rig scheduling problem concerns finding a schedule for a fleet of rigs given a list of potential wells to be drilled. Each rig has a capacity and time period of availability, while each well comprises a production value, a pad assignment and a time window in which it can be drilled. Operational constraints limit the number of rigs on a pad to one, and the moving and dismantling time is applicable each time a rig moves from one pad to another. Notably, a narrow or restricted time window identifies wells with strong conditions imposed by client needs. That is, wells that must be drilled on or by certain days, often in order to retain lease rights. For this reason, the critical assumption in the procedure is firstly, to meet the satisfiable stipulated conditions, and secondly, to maximize the production value of the selected wells. Significantly, the fleet-sizing procedure can be used to identify how many additional rigs are required by type and period of use to meet the outstanding conditions, or to provide the optimal fleet size to meet the satisfiable conditions from the outset when no fleet is given. The proposed decomposition-based scheme is presented in this report with several practical test cases.

Wells

Consider a well w∈{1, ..., W}. First w is assigned a "production value" denoted by $V_w$. This value can be anything ranging from barrels of oil to net value generated by the well in $. This pre-computed fixed value should be defined with the purpose of being maximized.

In addition, w is part of a "pad" denoted by $P_w$. A "pad" is a location from which one or multiple wells are drilled. When installed on a pad, a rig can drill multiple wells without being dismantled. Most importantly, on any given day, there can only be a single rig on a given pad (a rig is considered to be on a pad from the first day of its installation to the last day of its dismantling). Finally there are P pads numbered from 1 to P, and $W_p$ denotes the set of wells on pad P∈{1, ..., P}.

A well w can have timing requirements where T refers to a time period of interest. $T_w^S$ (resp. $T_w^E$) is the first (resp. last) day when w is available to be drilled. If $T_w^S=1$ and $T_w^E<T$ then w is referred to as a "BY" well. If $T_w^S=T_w^E$ then w is referred to as a "ON" well. If w is neither ON or BY, then it is assumed that $T_w^S=1$ and $T_w^E=T$ and is referred to as an "ADD" well. We denote $W_{ON}$, $W_B$, $W_{ADD}$ the sets of ON, BY and ADD wells.

Finally, some wells can only be drilled by specific rigs so we denote the set of rigs that can drill w by $R_w \subset \{1, ..., R\}$. Equivalently, $w_r$ is the set of wells that rig r can potentially drill.

No Transportation Assumption

As previously mentioned, each well w belongs to a pad p. In this paper, it is assumed that the maximum time between two pads is relatively small compared to 24 hours (1 day) and hence can be neglected. The reason for this is that a "day" is the unit of measure of the rig capacity, installation and dismantling times. By incorporating transportation times of the order of hours, the resulting schedule will be very sensitive to external factors (delays due to traffic, weather for instance) and will not be robust.

More formally, it is possible, though not mandatory, to provide a position for each pad p denoted by $(x_p, y_p)$. If it is the case, one can easily compute the diameter of the field using $D_{max}=\max_{p,q}\{d(p,q)\}$ where d(p,q) is the distance between two pads p and q (which can be $d(p,q)=\sqrt{(x_p-x_q)^2+(y_p-y_q)^2}$). Furthermore, one can suppose a speed for the trucks transporting the rigs denoted by σ. The validity of the no transportation time assumption can be checked by the condition:

$$\frac{D_{max}}{\sigma} \ll T_{max}$$

where $T_{max}$ denotes the maximum travel time.

The current model assumes no transportation time. Note that, if the transportation times are constant between any two pads and even multiple of days, then it can be incorporated as follows: add half of time in the installation and half in the dismantling time of each rig. If the transportation times are of the order of the day but differ between pads, then this model would have to be modified.

Data

In summary, the input data from the user is:
1. The time horizon considered which leads to the number of days for the required schedule.
2. The rig information with each capacity, start and end days, installing and dismantling times in days.
3. The well information with each value, pad, start and end days.
4. The truck speed and maximum travel time to check the no-transportation time assumption.

The notations are summarized in the following table:

TABLE 1

Parameters (in bold are the input parameters)

| Entity | Feature | Notation |
|---|---|---|
| general | number of days | T |
| | number of wells | W |
| | number of rigs | R |
| | number of pads | P |
| | set of ON wells | $W_{ON}$ |
| | set of BY Wells | $W_{BY}$ |
| | set of ADD Wells | $W_{ADD}$ |
| | truck speed | σ |
| | maximum travel time | $T_{max}$ |
| rig r | capacity | $C_r$ |
| | start day | $T_r^1$ |
| | end day | $T_r^2$ |
| | installing time | $I_r$ |
| | dismantling time | $D_r$ |
| | moving time | $M_r$ |
| | set of drillable wells by r | $W_r$ |
| well w | value | $V_w$ |
| | pad | $P_w$ |
| | start day | $T_w^S$ |
| | end day | $T_w^E$ |
| | set of eligible rigs for w | $R_w$ |
| pad p | set of wells on p | $W_p$ |

$T_r^1$ (resp. $T_r^2$) is the first (resp. last) day when r is available to be used. Finally, $I_r$ (resp. $D_r$) corresponds to the number of days required to install r on (resp. dismantle r from) a pad (see below for the definition of a pad) and $M_r=I_r+D_r$ defines the moving time of r.

Objective Function

As the reason for time constraints imposed by the client are unclear to the operator, the first goal of the operator should be to maximize the number of time requirements that can be met given the aforementioned constraints. Given a schedule S, the number of constraints met is equal to the number of ON ($N_{ON}(S)$) and BY ($N_{BY}(S)$) wells that are drilled in S and is denoted by $N(S)=N_{ON}(S)+N_{BY}(S)$. Secondly, a "good" schedule should aim to maximize the production value. The production value of a schedule S is the sum of the production values of all the selected wells in S and is denoted by V(S).

According to embodiments of the present disclosure, the objective function may be defined as:

$$\max_S (N(S), V(S))$$

and can be optimized lexicographically, i.e., firstly N(S) can be maximized and then V(S).

Note: this is equivalent to optimize the single objective function $\overline{V} \times N(S)+V(S)$ where $\overline{V}$ is an upper bound on V(S) for all schedule S. However, for the ease of notation we will keep the vector notation.

Inconsistencies

If the rig fleet was large enough and conditions are satisfiable, the best schedule S should have $N(S)=|W_{ON}|+|W_{BBY}|$. However this may not be possible due to inconsistencies in the input data. Preferably, these inconsistencies should be corrected by the user before solving the problem. There are two types of inconsistencies.

Pad Inconsistencies

Consider a pad $p \in \{1, \ldots, P\}$ such that $|W_p \cap W_{ON}| > 1$. Consider each pair $(w \neq v) \in W_p \cap W_{ON}$ of distinct wells in pad p such that $T_w^S, T_v^S$. If $$T_v^S < T_w^S + \min_{r \in R_w} \{C_r\},$$

then either w or v cannot be drilled due to a pad inconsistency. In other words, if w has to be drilled before v, but their drilling time is not separated by at least the best rig capacity (the smallest one) that can drill w.

Rig Inconsistencies

Consider a rig $r \in \{1, \ldots, R\}$ and each pair $(w \neq v) \in W_{ON}$ of distinct wells such that $R_w = R_v = \{r\}$ and $T_w^S, T_v^S$. If $$T_v^S < T_w^S + C_r + M_r \times \chi(P_w \neq P_v)$$

where $\chi$ is the indicator function, then either w or v cannot be drilled due to a rig inconsistency.

Algorithms

In some embodiments the problem can be solved by formulating an integer program taking into account all types of wells (ON, BY and ADD) in conjunction with an appropriate solver (Cbc for open-source, Gurobi or CPlex if available). However, this solution appears to be intractable due to the curse of dimensionality, that is, the problem size becomes too large to solve for a high number of wells and rigs.

In order to bypass this issue, one can adopt one of two schemes detailed below:
1. An approximation scheme.
2. A decomposition scheme.

Approximation Algorithms

In this case, all wells are considered by a sub-optimal algorithm which gives the smallest optimality gap. Two such algorithms are considered:

A "weight scoring" algorithm with sub-functionals denoted by WS.

A "greedy" mechanism denoted by G.

Note that two other algorithms (called fastGreedy and Dual) that were studied are explained in the Appendix.

Weight Scoring (WS) Method

This method is a myopic method based on a scoring function computed with a set of weights. Note that in the following, $t_{r,w}$ defines a function that depends on r and w, so we can use $t_{s,v}$ to refer to the case $s \neq r$ and $v \neq w$.

Scoring Function

Given a set of weights y such that $y \in [0 1]^4$ with $$\sum_{i=1}^{4} y_i = 1,$$

the scoring function $f_y$ is a function of w the potential well to drill, $t_r$ the earliest available day of rig r, $t_{r,w} \ldots t_r$ the earliest day to drill well w with rig r. It is denoted by $f_y(w, t_r, t_{r,w})$.

For $w \in \{1, \ldots, W\}$ and $t_{r,w} \in [1, \ldots, T]$, we have:

$$f_y(w, t_r, t_{r,w}) = y_1 f_1(w) + y_2 f_2(w, t_r) + y_3 f_3(t_r, t_{r,w}) + y_4 f_4(w) \quad (1)$$

and the sub-functionals $(f_i) i \in \{1, \ldots, 4\}$ are described as follows:

$f_1$ is the normalized value of the well w. It gives a positive value to wells with high value:

$$f_1(w) = \frac{V_w}{\max_{w'}\{V_{w'}\}} \quad (2)$$

$f_2$ is the normalized difference between the earliest available day of r and the end date of w. It emphasizes wells that have time constraints:

$$f_2(w, t_r) = \frac{T_w^E - t_r}{T} \quad (3)$$

$f_3$ is the negative normalized idle time of rig r. It gives preference to wells that do not require the rig r to stand idle:

$$f_3(t_r, t_{r,w}) = \frac{-(t_{r,w} - t_r)}{C_r + M_r} \quad (4)$$

$f_4$ is the normalized function of rig requirements. It gives emphasis to wells that are highly constrained by rig requirements:

$$f_4(w) = 1 - \frac{|R_w|}{R} \quad (5)$$

Given a set of weights y, one approach according to embodiments of the present disclosure for WS works as follows:

Let $t_r \in \{1, \ldots, T\}$ be the earliest time for which at least one rig is available. Let r be such a rig with highest capacity.

1. Urgent Wells: A well w is urgent at time $t_r$ for rig r if $T_w^E < t_r + C_r + M_r$ and urgentWells is the set of such wells. If urgentWells is not empty, consider the most urgent well w in this set. If w can be assigned to a different rig than r with less idle time than r or with same idle time but greater rig capacity, then do so and remove w from urgentWells. If not, assign w to the schedule of r and skip the next step. If all wells from urgentWells are assigned to other rigs than r, consider the next step.

2. Non-Urgent Wells: For all wells with a potential start date $t_{r,w}$ such that $t_{r,w} \in \{t_r, \ldots, t_r + C_r + M_r - 1\}$, compute the scoring function $f_y(w, t_r, t_{r,w})$. Insert in the rigSchedule, the well w such that $f_y(w, t_r, t_{r,w})$ is maximized.

FIG. 1 illustrates pseudo code for weight scoring method according to embodiments of the present disclosure. Pseudo code in this disclosure is to be understood to represent embodiments of how a method can be implemented. It is to be understood that there are alternative methods for coding and virtually limitless ways to code a given method and the present disclosure is not limited to the particulars of the pseudo code.

Weight Optimization

An astute reader will notice that the resulting schedule depends on the set of weights y used to compute the scoring function. However the optimal set of weights may not be known. Therefore the WS method considers a random search in the space of weights and retains the solution that maximizes the objective value. There is a convergence criteria on this search process: if there is no improvement of the best solution after a certain number of evaluations ($\kappa \in \mathbb{N}$), then the search stops.

Note: a genetic algorithm approach was also implemented but the random weight procedure proved to be as effective with fewer evaluations.

Greedy (G) Method

According to embodiments of the present disclosure, the methods can include to rank the wells lexicographically first by end date, then by value, and then to check if the highest ranked well can be added to the schedule by finding the earliest start drilling day when the well is available ($[T_w^S, T_w^E]$). The process can be repeated until the list of wells is empty. The pseudo code of the method is given below. [H]

FIG. 2 illustrates pseudo code for the Greedy method according to embodiments of the present disclosure.

Note that this method was designed to work fine for "BY" wells. However, it can also be used on a different set of wells with varying performance.

Decomposition

In other embodiments another solution to the approximation scheme is to consider wells separately by type. That is, consider constrained wells (ON and BY) and then ADD wells. Among constrained wells, since ON wells are more constrained, it seems appropriate that they should be treated first. Hence, consider three phases, comprising the set of ON then BY and finally, ADD wells. In this scheme, one can use WS and G approximation schemes described above, or alternatively an integer program, such as the one detailed below. In summary, we list the possible algorithms in preference order for each phase as follows:

1. Phase ON: integer program for ON wells (IPON), WS, G.
2. Phase BY: G, WS.
3. Phase ADD: WS, G.

Note that an integer program tested for ADD wells is presented in the Appendix. However it did not prove as effective as the WS or G schemes.

Integer Program for ON Wells (IPON)

The goal is to find a combination of ON wells in order to maximize the number of ON wells drilled. Note there can exist several such combinations, hence we differentiate the solutions by selecting the one with highest production value.

Let us define an "artificial" value $V_w$ as: $\bar{V}_w = V_w + \max_{w' \in W_{ON}}\{V_{w'}\}$, and describe two incompatibility sets as follows:

1. Rig incompatibilities ($I_1$): this is the set of pairs of wells (w,v) that cannot be drilled by the same rig r, i.e. among the pairs in $I_1$ only one element can be drilled by r. Mathematically, this requirement is defined by:

$$I_1 = \{(w,v,r) \in W_{ON} \times W_{ON}\setminus\{w\} \times R_w | T_v^S \ldots T_w^S, T_w^S < T_v^S + C_r^R + M_r \times \chi(P_v \neq P_w)\}.$$

2. Pad incompatibilities ($I_2$): this is the set of pairs of wells (w,v) that cannot be drilled by the two distinct rigs r≠q. If two wells are on the same pad and their dates are "too" close, they cannot be drilled by two different rigs. That is, if two ON wells are on the same pad and their dates differ by less than the minimum rig capacity, it will be impossible to drill both wells. This is defined as follows:

$$I_2 = \{(w,v,r,q) \in W_{ON} \times W_{ON} \cap P_w\setminus\{w\} \times R_w \times R_v\setminus\{r\} | T_v^S \ldots T_w^S, T_w^{S<T_v^S} + C_r^R + M_r\}.$$

The only variable is
$x_{wr} \in \{0,1\}$: 1 if well w is drilled by rig $r \in R_w$
We can formulate the IP as follows:

$$\text{Maximize}\left(\sum_{w,r} \bar{V}_w x_{wr}\right)$$

subject to $$\sum_r x_{wr},\ 1,\ \forall\ w \in ON$$

$$x_{wr} + x_{vr},\ 1,\ \forall\ (w,v,r) \in I_1$$

$$x_{wr} + x_{vq},\ 1,\ \forall\ (w,v,r,q) \in I_2$$

Solving this problem, we get the solution for the ON phase which gives an allocation of all possible ON wells to rigs that meet the given constraints (e.g. rig, pad, time windows, etc)

Scheduling Algorithm

Given all these algorithms, the proposed solution was chosen after testing the different methods on different test cases and is described below algorithmically.

Let $T^{solve}$ be the time in seconds specified by the user to solve the scheduling problem.

FIG. 3 illustrates pseudo code for a scheduling algorithm according to embodiments of the present disclosure.

Rig Schedule

FIG. 4 is a schematic diagram 10 illustrating systems and methods for optimizing rig scheduling according to embodiments of the present disclosure. To schedule a rig fleet certain characteristics are identified and an order of priority is assigned to the characteristics. In some embodiments certain wells have constraints which may come from the lease of the land, access to the wellsite, geopolitical factors, or virtually any other constraint upon the timing of access to the well site. The wells are first grouped into three groups: "ON", "BY", and "ADD". ON wells are wells which must be drilled on a given day or days. These are the highest priority because they are the least flexible. BY wells are wells with an end date of availability and as such must be drilled "by" a certain date. These are the second highest priority because there is more flexibility to the wells. If scheduling permits these wells can be drilled earlier than their "by" date, but not later. ADD wells (short for "additional") includes all other wells that are not ON or BY wells. These wells are the third and lowest priority because they may be drilled anytime. In many cases there is a global end date to the drilling period in question, and this global end date is factored into calculations in addition to the other parameters.

The processes and methods illustrated in FIG. 4 can be executed by a scheduler 11. The scheduler takes as input: 1) a fleet data 12, which can include such parameters as R rigs, each with a capacity $C_r$, start day $T_r^1$, end day $T_r^2$, installation $I_r$ and dismantling $D_r$ time. The scheduler also receives well data 14 which may include W wells to be drilled with a production value $V^w$, a pad $P_w$, a start day $T_w^S$, an end day $T_w^E$ and a set of permissible rigs $R_w$. The scheduler 11 also receives a set of parameters 16 which may include the time horizon of T days and solver parameters such as the time specified by the user to solve the $T_{solve}$, scheduling problem $R^{solve}$ the convergence criteria for WS method and the integer program solver. With these inputs, the scheduler 11 first solves IPON 18 for ON wells 17. IPON 18 is an integer problem which is an attempt to solve the problem. It is possible for the constraints to be managable and the IPON 18 is solvable in which case the overall endeavor of scheduling the rig is simplified. If it is solved within a certain optimality gap($|W_{ON}| \times \max_w\{V_w\}$), then BY wells 19 are treated by the G 20 method and ADD wells 22 with the WS 24 method. If IPON 18 was not solved, the scheduler 11 treats all wells using the WS 26 method. (The WS 26 method and WS 24 method can be the same method.) The scheduler 11 outputs a schedule S 28, the number of constraints met by S 28 denoted by N(S) and the total production value of the wells selected by S 28 denoted by V(S).

Accordingly, the scheduler 11 is configured to schedule wells in order of priority ON>BY>ADD, with other parameters such as production value having a lesser priority.

The following information was obtained using actual simulations and test data and is included to show certain features of the present disclosure and is not given in a limiting manner. Parameters and values are given here to show some test data but the scope of the present disclosure is not limited to the numerical values or relationships.

Data

The two data sets (representative of real test cases) are presented in Table 2.

TABLE 2

Data summary of two test cases

| Data | Test Case A | Test Case B |
|---|---|---|
| start Date | Jan. 1, 2016 | Jan. 1, 2015 |
| end Date | Dec. 31, 2019 | Dec. 31, 2019 |
| R | 5 | 5 |
| W | 571 | 1308 |
| $\|W_{ON}\|$ | 41 | 48 |
| $\|W_{BY}\|$ | 55 | 9 |

Note that the wells have different rigs requirements. Moreover, the rigs do not have the same start and end dates. We consider both test cases with identical rig installing/dismantling times of 0/0 and 3/2, giving a total of 4 test cases.

2.4.2 Results

Note that $T^{solve}=60$ s and the solver used was Cbc (expect for test case B with 3/2 where $T^{solve}=300$ s). Results are summarized in Table 3.

Test Case A1

:Test Case A with 0/0. Firstly, 2 inconsistencies are identified (1 of type pad and 1 of type rig). The resulting schedule drills 259 wells with 37 out of 41 ON wells and 55 out of 55 BY wells met, giving N(S)=92. In terms of value, V(S)=1.81×10⁶.

Test Case A2

:Test Case A with 3/2. Firstly, 2 inconsistencies are identified (1 of type pad and 1 of type rig). The resulting schedule drills 225 wells with 35 out of 41 ON wells and 55 out of 55 BY wells met, giving N(S)=90. In terms of value, V(S)=1.59×10⁶.

Test Case B1

:Test Case B with 0/0. Firstly, 6 inconsistencies are identified (6 of type rig). The resulting schedule drills 585 wells with 42 out of 48 ON wells and 9 out of 9 BY wells met, giving N(S)=51. In terms of value, V(S)=4.13×10⁶.

Test Case B2

Test Case B with 3/2. Firstly, 7 inconsistencies are identified (7 of type rig). The resulting schedule drills 585 wells with 41 out of 48 ON wells and 9 out of 9 BY wells met, giving N(S)=50 3.69×10⁶.

TABLE 3

Results summary

| Data | Test Case A1 | Test Case A2 | Test Case B1 | Test Case B2 |
|---|---|---|---|---|
| Rig Installing | 0 | 3 | 0 | 3 |
| Rig Dismantling | 0 | 2 | 0 | 2 |
| $\|W_{ON}\| + \|W_{BY}\|$ | 96 | 96 | 57 | 57 |
| Inconsistencies | 2 | 2 | 6 | 7 |
| $N_{ON}(S)$ | 37 | 35 | 42 | 41 |
| $N_{BY}(S)$ | 55 | 55 | 9 | 9 |
| N (S) | 92 | 90 | 51 | 50 |
| V (S) × 10⁶ | 1.81 | 1.59 | 4.13 | 3.69 |

Note that, in test case B, inconsistencies and N(S) sum up to $\|W_{ON}\|+\|W_{BY}\|$ which indicates that the solution provided is the best given the data available (in terms of constraints).

In test case A, inconsistencies and N(S) do not sum to the total number of conditions. This state leads to the development of optimal fleet sizing in the next section.

Fleet Sizing

As shown in the previous section, some constraints may not be met due to the lack of rigs. Moreover, in the case where no rigs are owned, one may be interested in sizing a potential fleet to drill the given list of wells. This section aims to address these concerns.

Problem Description

New Data

As per to the original problem, there is a list of wells to drill and a fixed fleet of rigs which has a cost equal to 0. In addition, there are potential rigs to hire.

The first input is an upper bound on the number of additional rigs $R^{Add} \ldots 0$. In addition, the list of hireable rigs is given by type of rigs. There are $\Delta$ types of rigs and each type of rig $\mu \in \{1, \ldots, \Delta\}$ is given with:

A capacity $C_\mu^A \in \mathbb{N}$.

A number of rigs available $N_\mu^A \in \mathbb{N}$: at most $N_\mu^A$ rigs of type $\mu$ can be added.

An installation time $I_\mu^A \in \mathbb{N}$.

A dismantling time $D_\mu^A \in \mathbb{N}$.

An earliest start date $T_\mu^{A,1} \in \mathbb{N}$: a rig of type $\mu$ cannot be hired earlier than $T_\mu^{A,1}(1, T_\mu^{A,1}, T)$.

An end date $T_\mu^{A,2} \in \mathbb{N}$; a rig of type $\mu$ can be hired until $T_\mu^{A,2}(1, T_\mu^{A,2}, T)$.

A minimum hiring period $M_\mu^A \in \mathbb{N}$: minimum number of days for which the rig has to be hired ($M_\mu^A, T_\mu^{A,2}-T_\mu^A$, 3). So the latest start date is $T_\mu^{A,2}-M_\mu^A+1$.

A hiring cost $C_\mu^{A,h}$: cost incurred just to hire a new rig of type $\mu$, specified in the same unit as the value of a well.

An operating cost $C_\mu^{A,h}$: cost incurred per day of utilization of a rig of type $\mu$, also specified in the same unit as the value of a well.

New Fleet

If $R_{Add}=0$, the problem is equivalent to the scheduling problem of the previous section and the scheduling algorithm solves the problem.

Given $R_{Add} \in \mathbb{N}$, an additional fleet of $R_{Add}$ rigs is defined as follows: for each additional rig $r \in \{1, \ldots, R_{Add}\}$, the solution must specify:

The type of r, $\mu_r \in \{0, \ldots, \Delta\}$, where $\mu_r=0$ means that r is not selected to be added as an additional rig.

The hiring start date $d_r^1 \ldots T_{\mu_r}^{A,1}$.

The hiring end date $D_r^2, T_{\mu_r}^{A,2}$ such that $d_r^2-d_r^1 \ldots M_{\mu_r}^A$.

The cost incurred is equal to $C_{\mu_r}^{A,h}+C_{\mu_r}^{A,o}(d_r^2-d_r^1)$.

This solution can be represented by an array of size $R_{Add} \times 3$. Now, we simplify the representation of the new fleet for the solver. First, the type of the $R_{Add}$ additional rigs can be expressed in a vector of integers of length $R_{Add}$ (e.g. (1, 2, 0) represents a new fleet of one) rig of type 1 and one rig of type 2 for $R_{Add}$=3). Given $R_{Add}$ and $\Delta$ and $(N_\mu^A)_{\mu \in \{1, \ldots, A\}}$, we can map each vector of types to a unique integer X (see a mapping example in Table 4).

TABLE 4

Mapping example for $N_{Add}$ = 3, $\Delta$ = 3, $(N_1^A, N_2^A, N_3^A)$ = (2, 1, 1).

| New Fleet Type Integer | New Fleet Type Vector |
|---|---|
| 1 | (0, 0, 0) |
| 2 | (1, 0, 0) |
| 3 | (2, 0, 0) |
| 4 | (3, 0, 0) |
| 5 | (1, 1, 0) |
| 6 | (1, 2, 0) |
| 7 | (1, 3, 0) |
| 8 | (2, 3, 0) |
| 9 | (1, 1, 2) |
| 10 | (1, 1, 3) |
| 11 | (1, 2, 3) |

In addition, $(d^1, d^2)$ can be mapped uniquely to another vector $(\alpha_r^1, \alpha_r^2) \in [0,1]^2$ such that:

$$d_r^1 = T_{\mu_r}^{A,1} + \alpha_r^1 (T_{\mu_r}^{A,2} - M_{\mu_r}^A - T_{\mu_r}^{A,3} + 1)$$

$$d_r^2 = d_r^1 + \alpha_r^2 (T_{\mu_4}^{A,2} - d_r^1)$$

Therefore a new fleet is defined by a vector $F=(X, \alpha^1, \alpha^2)$ of size $1+2R^{Add}$. The main advantage of this representation is that the genetic algorithm (GA) described below can be implemented without constraints, while taking into account all the new fleet constraints such as number of new rigs, start/end dates and minimum hiring time. It also reduces the number of variables.

Finally, note that given a fleet F, we can pre-compute its cost C(F).

New Objective

The objective is slightly different from different from the previous section. The objective according to embodiments of the present disclosure is to find a new fleet $F=(X, \alpha^1, \alpha^2)$ and an associated schedule S(F) such that we maximize firstly the number of time constraints met denoted by N(S(F)), and then the net value defined by V(S(F))–C(F), mathematically that is:

$$\max_F \left( \max_{S(F)} (N(S(F)), V(S(F)) - C(F)) \right)$$

Genetic Algorithm

Given a fixed fleet and a new fleet F, the inner maximization can be solved using the scheduling algorithm described in the previous section. In order to deal with the outer maximization on F, we use a genetic algorithm scheme. In order to use this scheme, the user specifies:

1. $R^{Add}$: number of additional rigs considered.
2. The population size.
3. The mutation probability.
4. A convergence criteria: if after a certain number of iterations, the best solution is not improved, the search stops.
5. The solving time permitted for the genetic algorithm.
6. The parameters of the scheduling algorithm, that is $T^{solve}$, the MIP solver and the convergence criteria for WS.

We describe here the crossover and mutation operators.

Crossover

Given a population, we select the top half with the highest objective function values. The crossover operator selects randomly two distinct elements from this pool. In order to "crossover" $F_1=(X, \alpha^1, \alpha^2)$ and $F_2=(Y, \beta^1, \beta^2)$, the resulting fleet $F_3=(Z, \gamma^1, \gamma^2)$ is such that:

1. Draw $\lambda$ uniformly at random in [¼,¾] and Z=nint($\lambda$X+(1–$\lambda$)Y).
2. For $r \in \{1, \ldots, R^{Add}\}$,
 (a) Draw $\lambda$ uniformly at random in [¼,¾] and $\gamma_r^1$=nint($\lambda \alpha_r^1 + (1-\lambda)\beta_r^1$).
 (b) Draw $\lambda$ uniformly at random in [¼,¾] and $\gamma_r^2$=nint*($\lambda \alpha_r^2 + (1-\lambda)\beta_r^2$).

where nint(.) is the nearest integer function.

Mutation

Given the mutation probability, for each element of the population, draw a Bernoulli random variable with this probability. If it is true, then draw randomly a new element.

Note that X=1 in the new fleet F is equivalent of not adding any additional fleet. Hence, the result of the scheduling algorithm is the same as before and independent of $(\alpha^1, \alpha^2)$. Therefore, the GA permits a new fleet with X=1 at most once in the initial population or after crossover and mutation.

Figure 5:
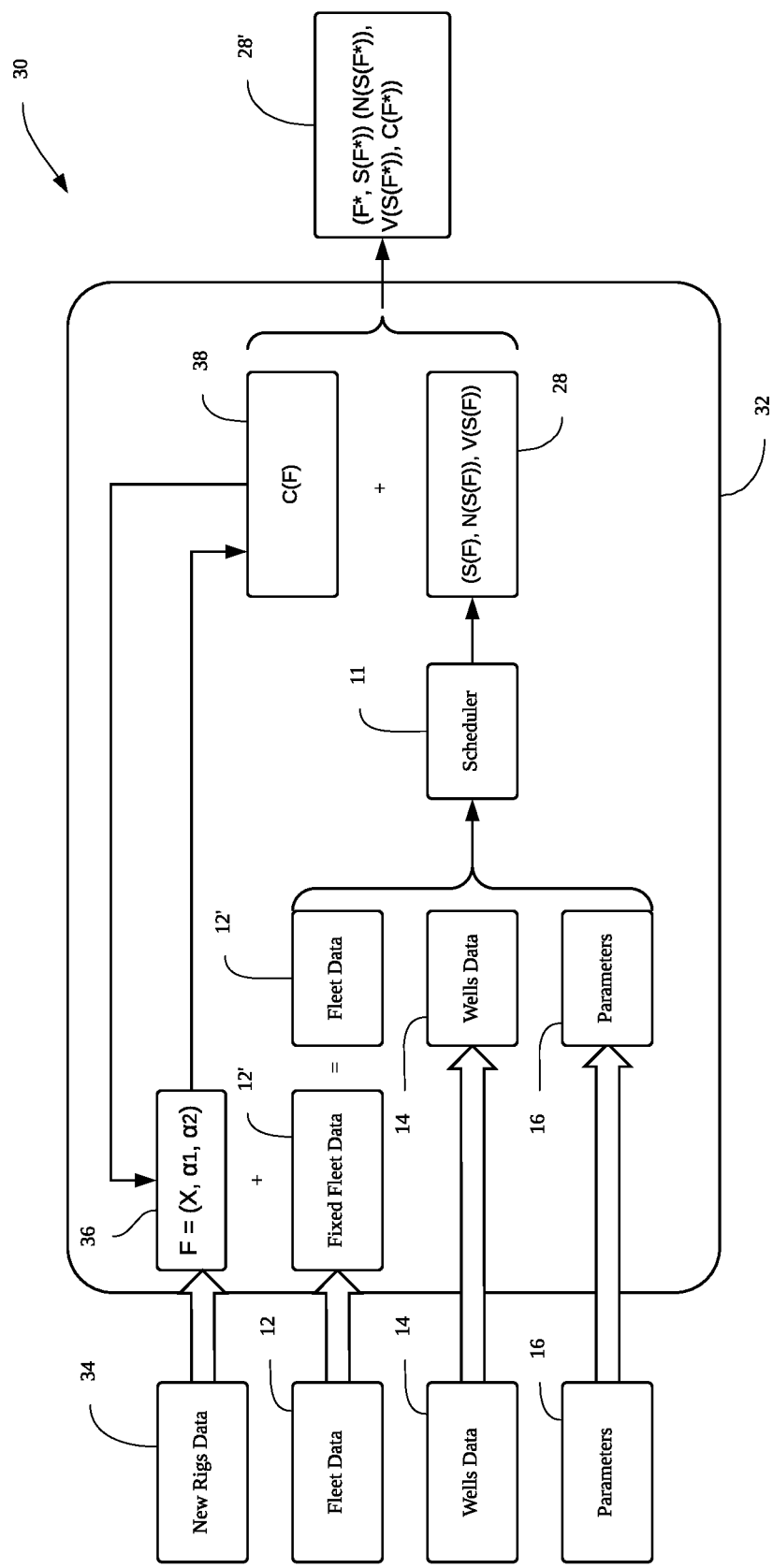
FIG. 5 is a schematic diagram depicting an optimizing algorithm according to embodiments of the present disclosure.

FIG. 5 is a schematic diagram depicting an optimizing algorithm according to embodiments of the present disclosure. An optimization routine such as a genetic algorithm (GA), a meta heuristic such as Tabu Search or Simulated Annealing, or any other suitable optimization routine can be used. The optimization routine is performed by an optimizer 32. The optimization routine developed for the sizing problem takes as input fleet data 12, wells data 14, and other parameters 16. The optimizer 32 also receives new rig data 34 which holds the types of rigs available for hire with a capacity $C_\mu^A$, the number of rigs available $N_\mu^A$, the installation time $I_\mu^A$, the dismantling time $D_\mu^A$, the earliest start date $T_\mu^{A,1}$, the end date $T_\mu^{A,2}$, a minimum hiring period $M_\mu^A$, a hiring cost $C_\mu^{A,h}$ and an operating cost $C_\mu^{a,o}$. The parameter file includes the parameters of the scheduler 11 as well as parameters for the optimization routine including the population size, the mutation probability, a convergence criteria and the total solving time. With these inputs, we generate a population of fleets F 36. For each $F_i$, the algorithm generates the fleet data 12' as input to the scheduler 11. The output from the scheduler is used together with the cost $C(F_i)$ 38 to establish the fitness value for each $F_i$. The optimization routine's operations (crossover and mutation) are then applied to the population and this process repeats until the solving time or the convergence criteria is met. The optimizer 32 outputs the best fleet F* 28' and its associated schedule S(F*) (and other metric such that N(S(F*)), V(S(F*)) and C(F*)).

Results

Recall that both cases Test B1 and Test B2 do not require any fleet sizing as the resulting schedule meets the maximum number of constraints (including the inconsistencies). Therefore, we focus here on Test A1 and Test A2.

We summarize the new rigs data as follows:

TABLE 5

Additional rigs

| Type | 1 | 2 |
|---|---|---|
| Number | 1 | 1 |
| Capacity | 20 | 25 |
| Installing Time | 0 or 3 | 0 or 3 |

TABLE 5-continued

Additional rigs

| | | |
|---|---|---|
| Dismantling Time | 0 or 2 | 0 or 2 |
| Start | Jan. 1, 2016 | Jan. 1, 2016 |
| End | Jan. 1, 2018 | Jan. 1, 2018 |
| Min Period | 30 | 30 |
| Hiring Cost | 0 | 0 |
| Operating Cost (per day) | 500 | 400 |

We run the two cases A1 and A2 with $R_{Add}=1,2$ which results in four cases:

Test Case A1/1

:Test Case A1 with $R^{Add}=1$. The resulting fleet consists of one rig of type 1 from 29 Apr. 2016 to 24 Oct. 2016. The resulting schedule drills 269 wells with 39 out of 41 ON wells and 55 out of 55 BY wells met, giving N(S)=94. In terms of value, the production value is $1.86\times10^6$, the cost incurred is $0.09\times10^6$ which results in a net value of $1.77\times10^6$.

Test Case A1/2

:Test Case A1 with $R^{Add}=2$. The resulting fleet consists of one rig of type 1 from 9 Apr. 2016 to 20 Nov. 2016. The resulting schedule drills 273 wells with 39 out of 41 ON wells and 55 out of 55 BY wells met, giving N(S)=94. In terms of value, the production value is $1.88\times10^6$, the cost incurred is $0.11\times10^6$ which results in a net value of $1.77\times10^6$.

Test Case A2/1

:Test Case A2 with $R^{Add}=1$. The resulting fleet consists of one rig of type 1 from 1 May 2016 to 19 Oc. 2016. The resulting schedule drills 233 wells with 38 out of 41 ON wells and 55 out of 55 BY wells met, giving N(S)=93. In terms of value, the production value is $1.60\times10^6$, the cost incurred is $0.09\times10^6$ which results in a net value of $1.51\times10^6$.

Test Case A2/2

Test Case A2 with $R^{Add}=2$. The resulting fleet consists of one rig of type 1 from 2 Apr. 2016 to 26 May 2017 and one rig of type 2 from 2 Apr. 2016 to 26 May 2017. The resulting schedule drills 250 wells with 39 out of 41 ON wells and 55 out of 55 BY wells met, giving N(S)=94. In terms of value, the production value is $1.73\times10^6$, the cost incurred is $0.38\times10^6$ which results in a net value of $1.35\times10^6$.

TABLE 6

Results summary

| Data | Test Case A1/1 | Test Case A1/2 | Test Case A2/1 | Test Case A2/2 |
|---|---|---|---|---|
| $R_{Add}$ | 1 | 2 | 1 | 2 |
| Rig Installing | 0 | 0 | 3 | 3 |
| Rig Dismantling | 0 | 0 | 2 | 2 |
| $\|W_{ON}\| + \|W_{BY}\|$ | 96 | 96 | 96 | 96 |
| Inconsistencies | 2 | 2 | 2 | 2 |
| $N_{ON}(S(F))$ | 39 | 39 | 38 | 39 |
| $N_{BY}(S(F))$ | 55 | 55 | 55 | 55 |
| $N(S(F))$ | 94 | 94 | 93 | 94 |
| $V(S(F)) \times 10^6$ | 1.86 | 1.88 | 1.60 | 1.73 |
| $C(F) \times 10^6$ | 0.09 | 0.11 | 0.09 | 0.38 |
| $V(S(F)) - C(F) \times 10^6$ | 1.77 | 1.77 | 1.51 | 1.35 |

We find that in the case of 0/0 installing/dismantling times, one additional rig is sufficient to meet the total number of satisfiable constraints. That is, N(S(F)) and the inconsistencies sum to the total number of conditions. In the case of 3/2 installing/dismantling times, two rigs are required to meet all conditions, which reduces the net value significantly.

Three methods developed and tested, but not retained in the overall scheme, are presented in this section.

Figures 6, 7:
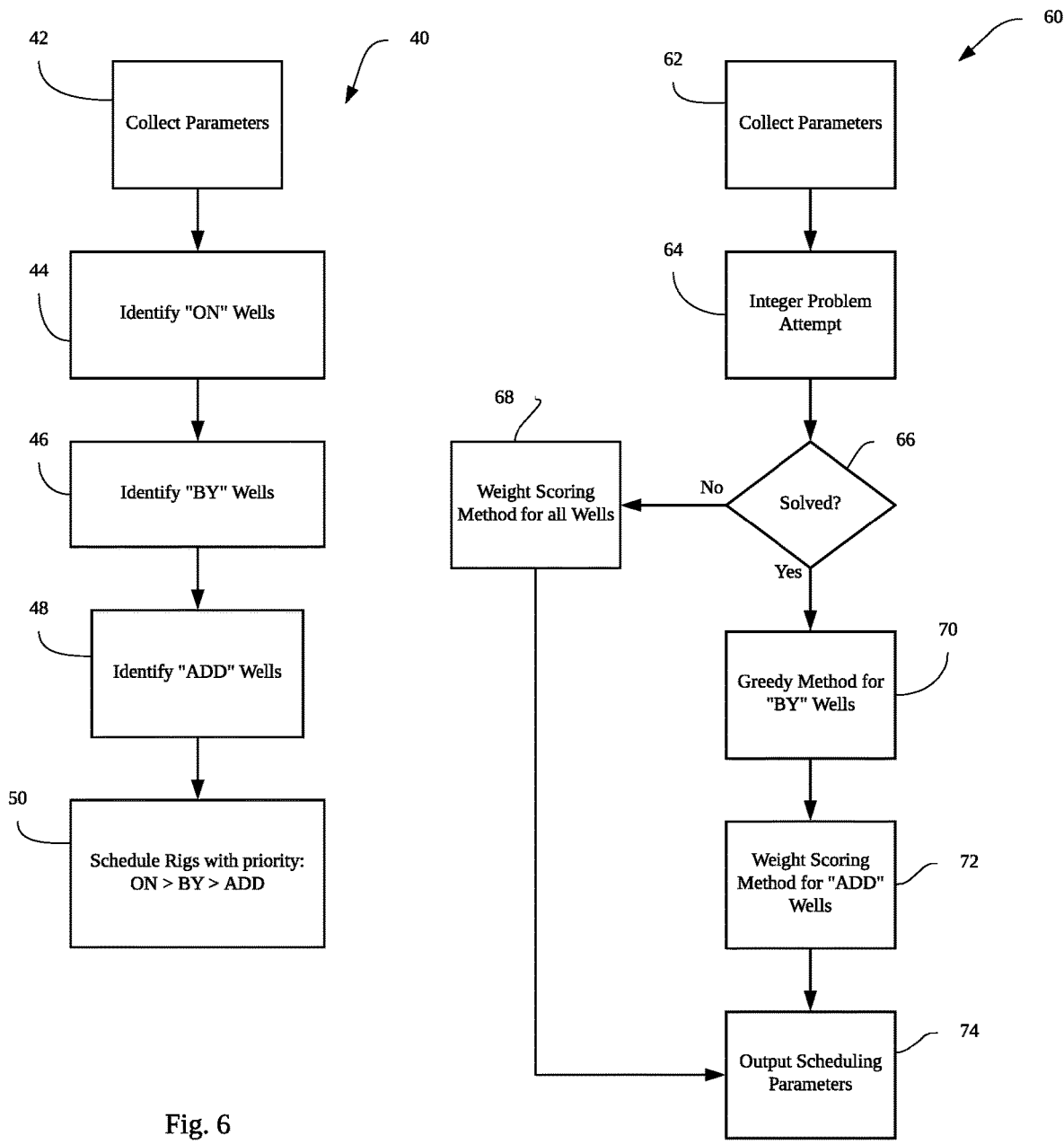
FIG. 6 is a schematic block diagram showing a method according to embodiments of the present disclosure.
FIG. 7 is a schematic block diagram of a method according to further embodiments of the present disclosure.

FIG. 6 is a schematic block diagram showing a method 40 according to embodiments of the present disclosure. At 42 parameters are collected. The parameters can be any salient parameter and includes fleet data and well data. The fleet data pertains to the fleet of rigs, the capacity, availability, cost of operating, moving, hiring the rigs, etc. Wells data includes time constraints for the wells. The parameters can also include the solution parameters such as convergence criteria and any other suitable parameter which may be needed. At 44 ON wells are identified. ON wells are wells which have a restrictive time window in which they must be drilled. In some cases, there are a few hours or a few days only in which the well can be drilled. The ON wells generally have a starting and ending availability window and as such are the most restrictive. At 46 BY wells are identified. BY wells are wells which must be drilled "by" a certain date/time. BY wells therefore have an ending availability time, but no beginning availability time. These wells are less restrictive than ON wells. At 48 ADD wells are identified. ADD wells can be simply the remainder of all wells, less ON and BY wells. Generally ADD wells have no time constraints upon when they can be drilled and as such are less restrictive than ON and BY wells. At 50 the method includes scheduling rigs with ON wells having higher priority than BY wells, and BY wells having higher priority than ADD wells. The method can also output a schedule for the rigs having a score, wherein the score pertains to how well or poorly the time constraints from which the ON, BY, and ADD designations are created.

FIG. 7 is a schematic block diagram of a method 60 according to further embodiments of the present disclosure. At 62 parameters are collected. This portion can be similar to 42 of the method 40 depicted in FIG. 6. The method 60 can also identify ON, BY, and ADD wells also in a similar manner. At 64 an integer problem for the ON wells is attempted. For some sets of data there is a simple solution and this attempt will produce a meaningful solution that does not require intensive computing. At 66 if the integer problem is not solved, the method includes applying the weight scoring method for all wells at 68. If, on the other hand, the integer problem is solved, at 70 the greedy method (or fast greedy method) is used for BY wells, and at 72 the weight scoring method is used for ADD wells. At 74 a schedule is output by the method which includes a schedule and a score that pertains to how well or poorly the schedule meets the ON, BY, and ADD criteria.

Method 1: Fast Greedy (FG) Method

This method is very similar to Greedy as it ranks wells based on their end dates ($T_w^E$) and their values ($V_w$) lexicographically. The main difference occurs in the process of incorporating wells into the rig Schedule. Instead of considering wells one at a time, Fast Greedy steps through time and for every day a rig is available, it tries to slot a well in the schedule of this rig (where potential wells are considered in the aforementioned ranked order).

FIG. 8 illustrates pseudo code for a fast greedy method according to embodiments of the present disclosure.

Method 2: Dual (D) Method

This method has three steps. First we select wells for each rig using an integer program. Then these wells are inserted (ON then BY then ADD in a greedy manner) rig-by-rig. Finally it tries to insert additional wells in the idle times that were not selected in the first step.

1: Well Selection

In order to select a subset of potential "good" wells for each rig, D solves the following integer program. For clarity, we define $\overline{V}_w = V_w + |W_{ON}| \times \max_w \{V_w\}$. We also define $\Delta$ to be the set of incompatible wells to be drilled by the same rig (see rig inconsistencies).

$$\text{Maximize}\left(\sum_{w,r} \overline{V}_w x_{wr}\right)$$

subject to $$\sum_r x_{wr}, 1, \forall w \in \{1, \ldots, W\}$$

$$\sum_r y_{pr}, 1, \forall p \in \{1, \ldots, P\}$$

$$x_{wr} = 0, \forall r \notin R_w, \forall w \in \{1, \ldots, W\}$$

$$C_r \sum_w x_{wr} + M_r \sum_p y_{pr}, \left\lfloor \frac{T_r^2 - T_r^1 + 1}{\gcd(C_r, M_r)} \right\rfloor \gcd(C_r, M_r),$$

$$\forall r \in \{1, \ldots, R\}$$

$$x_{wr}, y_{P_w r}, \forall w \in \{1, \ldots, W\}, \forall r \in \{1, \ldots, R\}$$

$$x_{wr} + x_{vr}, 1, \forall r \in \{1, \ldots, R\}, \forall (w, v) \in \Delta$$

We denote (X,Y), the optimal solution of this problem.

2: Preassigned Wells Insertion

For each rig r, we get from the previous step a list of wells pre-assigned to r, that is $\{w \in \{1, \ldots, W\} | X_{wr} = 1\}$. Given all these wells and rig r, we use the greedy method using $\nabla_w$ as indicative value of well w to slot wells in the schedule of r. We repeat this step for each rig r. Note that some of pre-assigned wells are not assigned to r and these are put in the pool of unassigned wells.

For each rig r:
- $A_r = \{w \in \{1, \ldots, W\} | X_{wr} = 1\}$ is a set of preassigned wells to rig r.
- Given this pre-assignment, allocate $A_r \cap W_{ON}$ wells from this set using the greedy method.
- Given this allocation of $A_r \cap W_{ON}$ wells, allocate $A_r \cap W_{BY}$ wells using the greedy method.
- Finally allocate $A_r \cap W_{ADD}$ wells using the greedy method.

3: Unassigned Wells Insertion

Given the schedule obtained in Step 2, we have a set of unassigned wells U. We use a modified greedy algorithm to try to slot the wells from the set U. First, we rank the wells in U by value. For each well $w \in U$, we check if it can be inserted in the schedule of rig r by sliding the pre-assigned wells if possible. If w cannot be assigned it is removed from U. This operation is repeated until U is empty.

Method 3: Integer Program for ADD Wells (IPADD)

We define $P_{ADD}$ as the set of pads with at least one ADD well. Given the resulting schedule from the BY phase, we can identify "slots" in which wells can be drilled. A slot s corresponding to rig r has 4 attributes:

1. $T_{rs}^C$: a start date, i.e. the day after the rig stopped drilling the previous well.
2. $T_{rs}^F$: an end date, i.e. the day before the rig starts drilling another well
3. $P_{rs}^C$: the pad on which the previous well was drilled (0 if $T_{rs}^C = 1$)
4. $P_{rs}^F$: the pad on which the next well is drilled (0 if $T_{rs}^F = H$)

Given a rig r, a slot is eligible depending on the following rules:
- $T_{rs}^F - T_{rs}^C \ldots C_r$ and $P_{rs}^C = P_{rs}^F \neq 0$
- If $T_{rs}^F - T_{rs}^C \ldots C_r + M_r$ and one of the three conditions: $P_{rs}^C = 0$ or $P_{rs}^F = 0$) or $P_{rs}^R \neq P_{rs}^F$ Given a rig r, let $S_r$ be the set of eligible slots for this rig with its 4 features.

We define $I_3$, to be the incompatible set of slots. Given two distinct rigs $r \neq q$ and two slots $s \in S_r, t \in S_q$ such that they "overlap", we only allow a pad to be drilled within one of these time slots but not both in order to avoid pad conflicts. Mathematically, we state:

$$I_3 = \{(r,q,s,t) \in \{1, \ldots, R\} \times \{1, \ldots, R\} \setminus \{r\} \times S_r \times S_q | [T_r^C, T_{rs}^F] \cap [T_{qt}^C, T_{qt}^F] \neq \emptyset \}$$

The two types of variables are
$x_{wrs} \in \{0,1\}$:1 if well $w \in W_{ADD}$ is drilled by rig $r \in R_w$ in slots $\in S_r$
$y_{prs} \in \{0,1\}$:1 if p ad $p \in P_{ADD}$ is drilled by rig $r \in R$ in slots $\in S_r$ We formulate the IP as follows:

$$\text{Maximize}\left(\sum_{w,r,s} V_w x_{wrs}\right)$$

subject to:

$$\sum_r x_{wr}, 1, \forall w \in W_{ADD}$$

$$x_{wrs}, y_{P_w rs}, w \in W_{ADD}, r \in R_w, s \in S_r$$

$$y_{prs} + y_{pqt}, 1, p \in P_{ADD}, (r, q, s, t) \in I_3$$

$$C_r \sum_w x_{wrs} + M_r \sum_p y_{prs} - I_r y_{P_{rs}^C rs} - D_r y_{P_{rs}^F rs}, T_{rs}^F - T_{rs}^C + 1,$$

$$r \in \{1, \ldots, R\}, s \in S_r$$

where $y_{P_w rs} = y_{prs}$ with $p = P_w$, $y_{P_{rs}^C rs} = y_{prs}$ with $p = P_{rs}^C$ and $y_{P_{rs}^F rs} = y_{prs}$ with $p = P_{rs}^F$. Recall that $I_r$ and $D_r$ are the rig installing and dismantling times of r.

This problem provides the allocation of wells to slots. Note that if a well from pad $_{rs}^C$ or $P_{rs}^F$ is selected for slot s of rig r, then it should be placed continuously with the pad (i.e. at the beginning or the end of the slot). Subsequently, the order of the other pads within a given slot does not affect the quality of the solution in this setting, as well as the order of wells within a pad.

The systems and methods of the present disclosure are directed to new approaches to the rig scheduling problem based on a number of decomposition and approximation schemes. Many algorithms were described and combined into a composite procedure with the aim of addressing the satisfiable conditions while maximizing the production value of the selected wells. In some applications there are conditions that cannot be met which is due to inconsistencies in the data or due to the lack of rig capacity. For the latter, the method also provides the means to establish the optimal fleet size required to satisfy the outstanding requirements and increase the overall production value. Future considerations include improving the mutation operator of the genetic algorithm for sizing and considering the possibility of using generic time windows for all wells.

The invention claimed is:
1. A method, comprising:
receiving a list of wells to be drilled;
dividing the wells into ON wells which have a specific start date of drilling availability, BY wells which have a fixed end date of drilling availability but no start date of drilling availability, and ADD wells which have no start or end data of drilling availability;

receiving fleet data, wells data, and parameters, wherein the parameters include a time horizon for the drilling operation;

attempting to solve an integer problem according to the ON wells using a solver software application running on a computer;

if the integer problem is solved, implementing a greedy method for BY wells and a weight scoring method for ADD wells using the solver software application, wherein the weight scoring method yields an output that is a function of a selected one of the wells to be drilled, an earliest day that a rig is available, and an earliest day to drill the selected well with the rig;

if the integer problem is not solved, implementing the weight scoring method for all wells using the solver software application;

outputting a schedule for the rig and the wells using the solver software application to increase an amount of oil produced from the wells; and deploying, the rig to cause the rig to drill the wells according to the schedule.

2. The method of claim 1 wherein the greedy method comprises:

sorting the wells according to the earliest day on which the wells are available to be drilled and then by a value of the wells;

for each rig available to drill, identifying the earliest day that the rig is available and assigning the rig to the earliest day for the well.

3. The method of claim 1 wherein the weight scoring method comprises:

identifying urgent wells, wherein an urgent well is one of the wells in which the earliest time to start drilling the well is earlier than the earliest time the rig is available for drilling, when factoring in a cost of using the rig and a moving cost for the rig;

identifying non-urgent wells, wherein a non-urgent well has a potential start date such that there is an available start date for at least one rig that is earlier than the earliest available date for the well;

randomly choosing weights;

repeatedly calculating a solution using weights generated by the weights;

retaining one of the solutions that maximizes an objective value;

if there is no improvement of the objective value of the solution after a predetermined number of attempts, ceasing calculating the solution and delivering the retained solution, wherein urgent wells are given higher priority than non-urgent wells.

4. The method of claim 1 wherein the parameters further include a time for solving the integer problem.

5. The method of claim 1 wherein the parameters further include a convergence criteria for the integer problem.

6. The method of claim 1 wherein the parameters further include a convergence criteria for the weight scoring method.

7. The method of claim 1 wherein the parameters further include a convergence criteria for the greedy method.

8. The method of claim 1 wherein the parameters further include at least one of capacity, number of rigs available, installation time, dismantling time, earliest start date, end date, minimum hiring period, hiring cost, and operating cost.

9. The method of claim 1, further comprising deploying the rig according to the schedule.

10. The method of claim 1 wherein the output comprises a combination of a normalized value of the selected well, a normalized difference between the earliest day that the rig is available and the fixed end date of the selected well, and a negative normalized idle time of the rig.

11. The method of claim 10 wherein the output comprises a sum of the normalized value, the normalized difference, and the negative normalized idle time.

12. The method of claim 11 wherein the normalized value, the normalized difference, and the negative normalized idle time are each multiplied by a different weighting factor.

13. A method, comprising:

receiving a list of wells to be drilled;

dividing the wells into ON wells which have a specific start date of drilling availability, BY wells which have a fixed end date of drilling availability but no start date of drilling, and ADD wells which have no start or end data of drilling availability;

receiving fleet data, wells data, and parameters, wherein the parameters include a time horizon for the drilling operation;

solving an integer problem according to the ON wells using a solver software application running on a computer;

determining that the integer problem was solved using the solver software application;

in response to determining that the integer problem was solved, implementing a greedy method for BY wells and a weight scoring method for ADD wells using the solver software application, wherein the weight scoring method yields an output that is a function of a selected one of the wells to be drilled, an earliest day that a rig is available, and an earliest day to drill the selected well with the rig;

outputting a schedule for the rig and the wells using the solver software application to increase an amount of oil produced from the wells; and deploying the rig to cause the rig to drill the wells according to the schedule.

* * * * *